United States Patent [19]

Halaby

[11] 3,718,765

[45] Feb. 27, 1973

[54] COMMUNICATION SYSTEM WITH PROVISION FOR CONCEALING INTELLIGENCE SIGNALS WITH NOISE SIGNALS

[76] Inventor: Josef Halaby, 1406 New York Ave., Brooklyn, N.Y. 11210

[22] Filed: Feb. 18, 1970

[21] Appl. No.: 12,180

[52] U.S. Cl. ............................179/1.5 M, 179/1.5 R

[51] Int. Cl. ...............................................H04m 1/70

[58] Field of Search..................179/1.5, 1.5 R, 1.5 M

[56] References Cited

UNITED STATES PATENTS

| | | | |
|---|---|---|---|
| 2,287,127 | 6/1942 | Phillips | 179/1.5 |
| 2,932,693 | 4/1960 | Wilcox, Jr. | 179/1.5 |
| 3,114,800 | 12/1963 | Simpkins | 179/1.5 |
| 2,129,860 | 9/1938 | Mitchell | 179/1.5 R |
| 3,012,098 | 12/1961 | Riesz | 179/1.5 R |
| 3,497,623 | 2/1970 | Todd | 179/1.5 R |

*Primary Examiner*—Benjamin A. Borchelt
*Assistant Examiner*—H. A. Birmiel
*Attorney*—Roberts & Cohen

[57] ABSTRACT

A communication system including phone stations, each of which includes a speaker-microphone arrangement with a noise generator and control circuits. The circuits are so connected that when the speaker-microphone portion of one station is transmitting intelligence to the other station, the first of these stations cannot transmit noise signals at the same time. However, this first station transmits a control signal to the other station to operate the control circuits therein to permit the noise generator to transmit noise onto the connecting cable to conceal the intelligence signal originating with the first station. The apparatus employs a conventional phone installation, the handset of which is accommodated in a separate casing, which in turn has a handset accommodated in the cradle of the telephone installation. The casing accommodates the noise generator and the control circuits as well as certain speaker and microphone elements necessary to cooperate therewith.

12 Claims, 6 Drawing Figures

INVENTOR.
JOSEF HALABY
BY
Posnack, Roberts & Cohen
ATTORNEYS

INVENTOR.
JOSEF HALABY
BY
Posnack, Roberts & Cohen
ATTORNEYS

INVENTOR.
JOSEF HALABY

BY

Posnack, Roberts & Cohen
ATTORNEYS

INVENTOR.
JOSEF HALABY

BY

Posnack, Roberts & Cohen
ATTORNEYS

COMMUNICATION SYSTEM WITH PROVISION FOR CONCEALING INTELLIGENCE SIGNALS WITH NOISE SIGNALS

FIELD OF INVENTION

This invention relates to secret and confidential communication systems and more particularly to apparatus adapted to be connected to telephone systems to prevent the unauthorized interception of intelligence being transmitted through the related system.

BACKGROUND

Secret communication systems are known in which the intelligence passing via a line or channel is mixed with an overriding noise signal to guard against unauthorized interception and interpretation. As is also known, the noise is balanced out at the terminal installation by means of balancing networks.

Many specific systems of the above generalized type have been proposed. However, most of these are only circuit improvements relating to the basic principle.

In some systems the masking of noise signals is of a random nature or comprises impulses of various frequencies. In other systems, the noise signals superimposed on the intelligence signals are modulated.

In some of the known systems, the masking signals are generated by a separate source which is independent of the intelligence or message signals. In other systems, the masking or noise signals are generated by a source which is controlled by the intelligence signals which it is desired be concealed or masked.

In general, known systems make use of balancing networks which are employed for separating the masking signals from the intelligence or message signals. Some systems make use of conventional balancing circuits such as hybrid networks. Other variations are also employed.

Despite the various improvements which have been employed, the use of the secret or confidential communication system is limited to specific applications such as, for example, the protection of off-premises extensions, private lines, and so forth. In any event, these systems require pre-arrangements or agreements between two parties for use while communicating.

SUMMARY OF INVENTION

It is an object of the invention to provide improved confidential communication systems of the above noted type.

It is an object of the invention to provide improved secret and confidential communication systems which are readily adapted for use by the general public.

Yet another object of the invention is to provide an improved secret and confidential communication system which is readily installed.

A further object is to provide an improved system of the above noted type which requires no prior arrangement between the two communicating parties to enable the use thereof.

Still a further object is to provide an improved secret and confidential communication system which is automatically operative during any communication taking place between two stations equipped with the apparatus of the invention.

It is yet a further object of the invention to provide an improved secret and confidential communication system in which the intelligence signals travelling in both directions are both masked or concealed.

In achieving the above and other objects of the invention there is proposed a telephone system comprising, for example, first and second telephone stations mutually coupled for the transmission of intelligence therebetween and each including speaker-microphone means, noise generator means coupled thereto and control means coupled to the noise generator means and speaker-microphone means. The speaker-microphone means of one station is adapted to transmit control signals from the associated control means to the control means of the other station which is thereby actuated to control the noise means of the other station to transmit noise signals to conceal intelligence being received by the station of the latter from the other station.

A telephone station of the above system will comprise a line or cable, a speaker, a microphone and a hybrid circuit connecting the speaker and microphone to each other and to the line or cable for the transmission and receipt of signals and for the balancing of signals between the speaker and microphone. An improvement is provided for interfering with the unauthorized interception and intelligence of signals passing between this installation and another like installation as has been noted hereinabove. Said improvement comprises a second speaker, a second microphone and means coupling the second microphone with the first speaker and the second speaker with the first microphone, said means selectively coupling intelligence signals from the second microphone to the first microphone for transmission via said line to said other apparatus or transmitting a control signal of predetermined frequency to the first microphone for transmission via said line to the other apparatus.

Said means includes a noise generator responsive to the signal of predetermined frequency to transmit a noise signal via the first microphone or to the line to conceal intelligence signals received from the other apparatus. The noise signal is balanced out in the aforesaid hybrid circuit whereby there is selectively transmitted intelligence signals or a control signal to cause the generation of noise in the other apparatus.

As a feature of the invention, the aforesaid means may include first and second generator means for generating first and second control signals, one of which is the first said control signal and first and second receiver means respectively adapted for receiving one of the control signals. Both the generator means are coupled to the first microphone, the receiver means being connected to the first speaker, there being cut-off means responsive to the receiver means to actuate the noise generator.

As will be seen hereinafter, there is employed a mixer coupling the generator means and noise generator to the first microphone with a specially actuated power supply being connected to the noise generator and generator means as well as to an amplifier which connects the second microphone to the mixer through which connection is made to the first microphone.

According to a feature of the invention, the apparatus thereof can be so constructed as to be readily installed in connection with conventional telephone sets comprising, for example, a cradle and a handset accommodated in the cradle and electrically coupled thereto. In such case the invention teaches the provision of a casing accommodating the aforesaid noise generator, generator means and receiver means and being provided with a handset which is interchangeable with that normally accommodated in the aforesaid cradle.

The above and further objects, features and advantages of the invention will be described in greater detail hereinafter.

DETAILED DESCRIPTION

Figure 1:
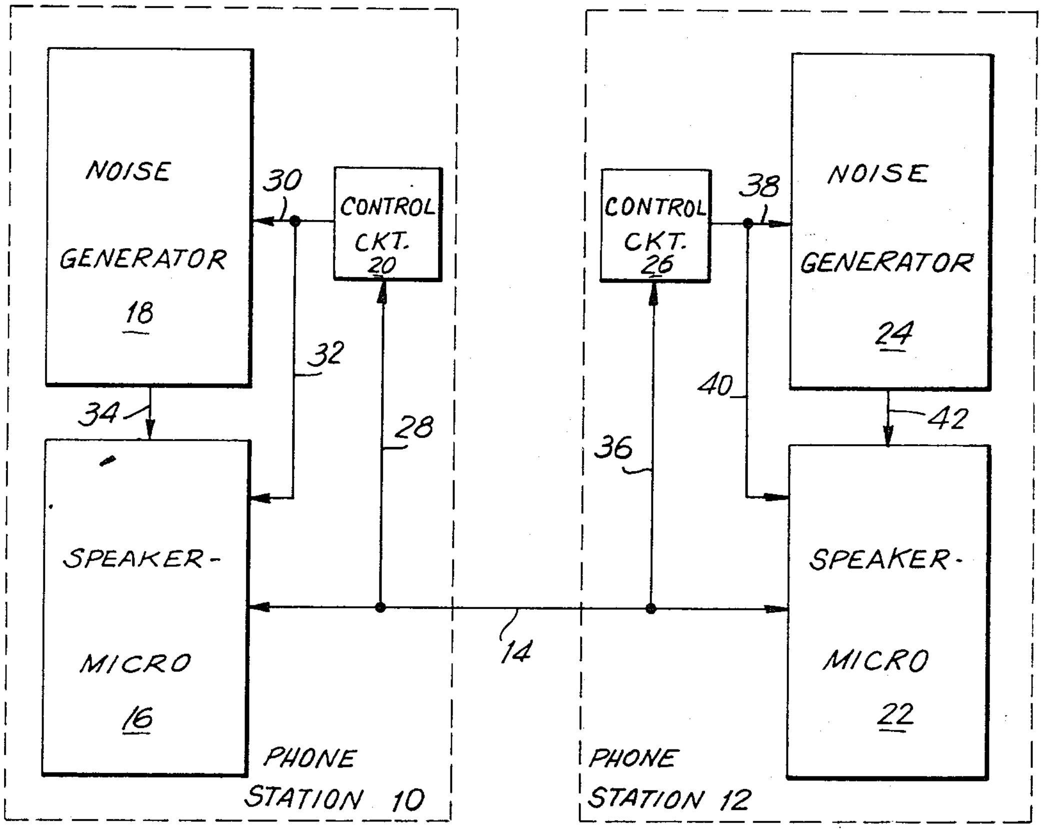
FIG. 1 is a block diagram of a communication system embodying two telephone installations provided with features of the invention.

FIG. 1 is a block diagram of a secret and confidential communication system embodying phone stations 10 and 12 coupled by a line or cable 14 and adapted for the transmission of intelligence signals therebetween.

Phone station 12 comprises a speaker-microphone section 22, a noise generator 24 and a control circuit 26.

Control circuit 20 receives signals via a line 28 and transmits signals via lines 30 and 32 to noise generator 18 and speaker-microphone section 16 respectively. Noise generator 18 transmits noise signals via line 34 to the speaker-microphone section 16.

Phone station 12 is similarly arranged. Control circuit 26 receives signals from cable 14 via line 36 and transmits control signals via lines 38 and 40 to noise generator 24 and speaker-microphone section 22 respectively. Noise generator 24 transmits signals via line 42 to speaker-microphone section 22.

When, for example, speaker-microphone section 16 is transmitting intelligence signals via line 14 to phone station 12, no noise signals are transmitted from station 10 to station 12 during such time. However, during the period of such transmission, control circuit 20 is transmitting a control signal via line 32 to the speaker-microphone section 16 to be transmitted via cable 14 to station 12, whereat the control signal enters control circuit 26 and causes noise generator 24 to generate noise which is transmitted by speaker-microphone section 22 onto line 14 to mask or conceal the intelligence signals passing along cable 14. The same is true in the reverse direction. Thus, although a specific station does not generate noise to conceal its own signal, it does generate a control signal which is transmitted to the receiving station which generates the noise which masks or conceals the signal on the connecting cable. This noise is in the receiving station station balanced out by the hybrid or balancing circuit included in the receiver set as is well known.

Although the above generalized description is a simplified version of how the circuit of the invention works, it relates to some of the basic principles of the invention. Another basic principle or advantage is that the improvement of the invention may be readily installed. This is shown with reference to FIG. 2.

Figure 2:
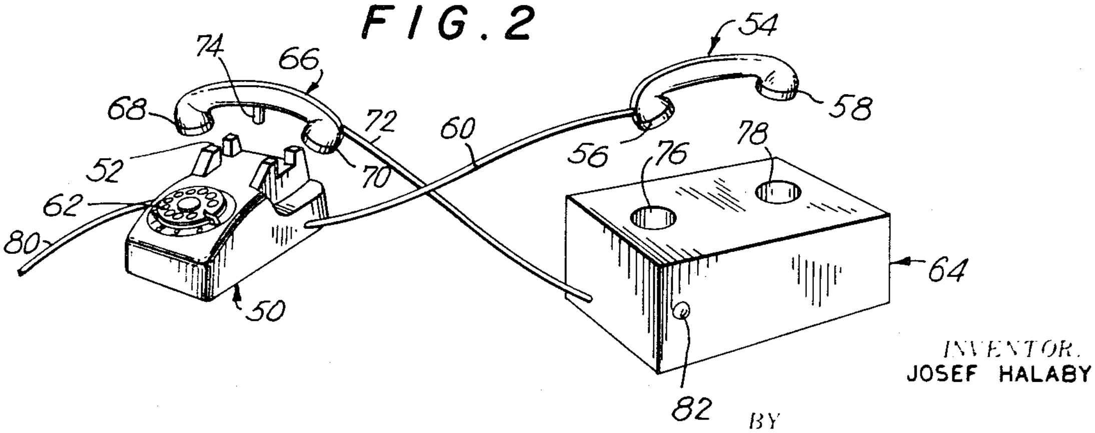
FIG. 2 is a perspective view of telephone installation provided in accordance with the invention.

The apparatus of FIG. 2 comprises a conventional telephone installation 50 including a cradle 52 and a handset 54, including a speaker-microphone section 56 and a microphone section 58. Hand set 54 is connected to installation 50 by means of a line 60. Normally, handset 54 is accommodated in cradle 52 and the telephone installation 50 is provided with a dial 62 and other such appointments as enables the telephone installation to be operated in usual and conventional manner.

In the present case, however, there is provided a separate casing 64 within which are accommodated the noise generator and control circuits of the invention. Casing 64 is provided with a hand set 66 having a speaker section 68 and a microphone section 70, the hand set 66 being connected electrically to the casing 64 and the circuits therein by means of a line 72. It will be noted that the hand set 66 is provided with a button switch 74, the purpose of which will be made hereinafter apparent.

Casing 64 is provided with a microphone opening 76 and a speaker opening 78 within which are respectively accommodated the speaker section 56 and the microphone section 58 of handset 54. Thus, it will appear that the handsets 66 and 54 are interchanged or crossed over between installation 50 and casing 64. Installation 50 is provided with a cable 80 for connecting into a communication system. Casing 64 is provided with a visual indicator 82 which lights to indicate that the set is operative. As will become apparent, the set is employed in conventional manner with handset 54 remaining permanently in receptacles 76 and 78 and with handset 66 being removed from cradle 52 to permit conversations with another station.

Figure 3:
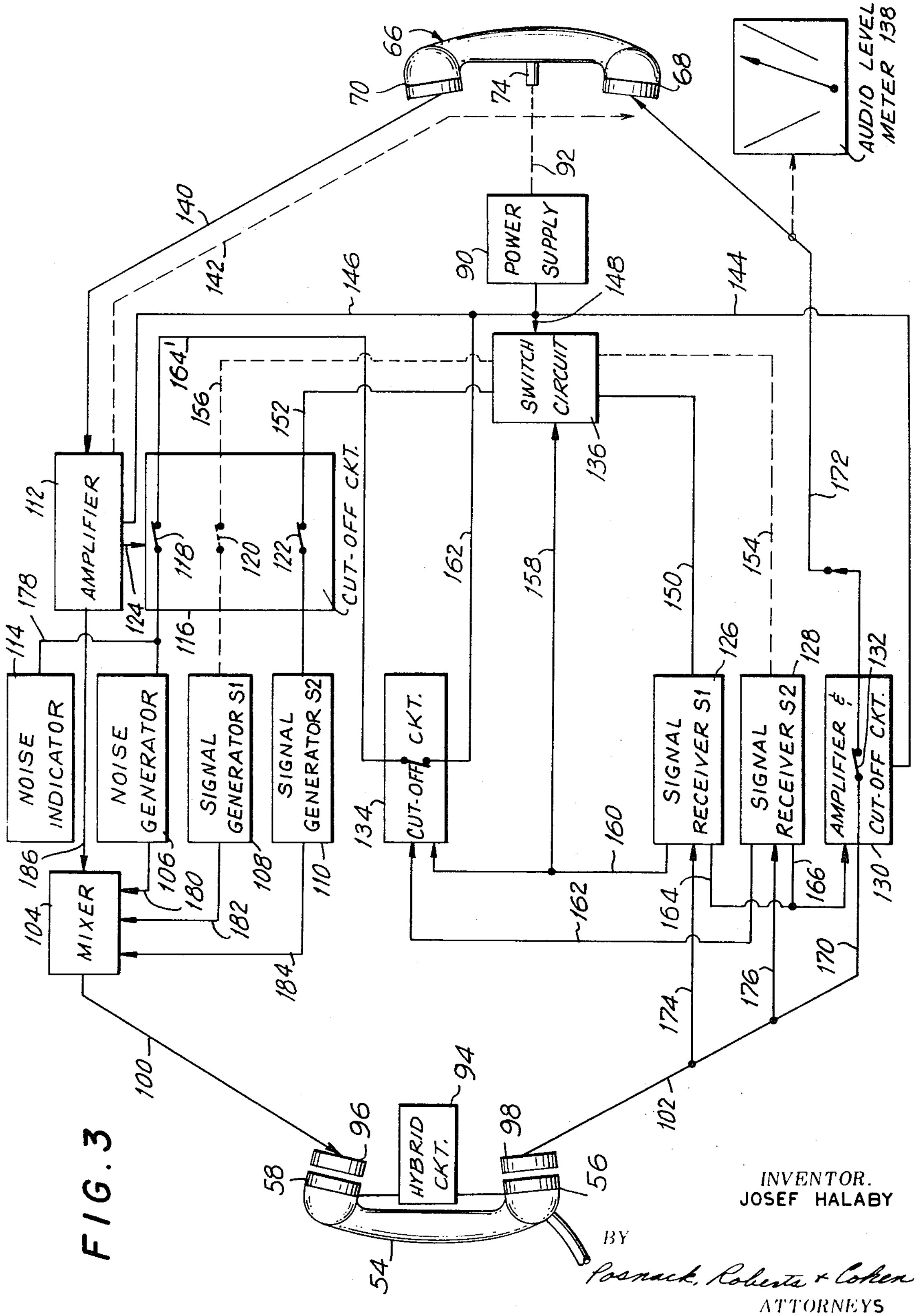
FIG. 3 is a partially broken and partially schematic diagram of a circuit provided for the selective generation of noise in accordance with the invention and incorporated into the apparatus of FIG. 2.

FIG. 3 illustrates the circuitry employed with handsets 66 and 54, which circuitry is for the most part embodied with the casing 64. It is, however, to be noted that such circuitry could readily be contained within a casing integral with that of telephone installation 50 to provide a unitary compact package. The present embodiment, however, shows how readily the apparatus and circuitry of the invention can be combined with installations already present in the field.

In FIG. 3, handset 66 includes speaker section 68 and microphone section 70 as previously described. Handset 54 includes microphone section 68 and speaker section 56 as previously described. Handset 66 includes button switch 74 which is coupled to and actuates a power supply 90. A connection with the power supply is indicated at 92 in diagrammatic form, many suitable electrical connections being applicable for purposes of enabling actuation of the power supply.

Diagrammatically indicated in association with handset 54 is hybrid circuit 94, the purpose of which is conventional and has been indicated hereinabove, whereat any suitable balancing circuit may be provided or substituted, the purpose thereof being to balance out noise which is generated in the associated circuits under the conditions to be set forth hereinafter.

The circuit of FIG. 3 comprises also an additional speaker 96 and an additional microphone 98, these elements being accommodated adjacent receptacles 76 and 78 in the casing 64 in FIG. 2. It is via these elements that communication is made between the two handsets, there being a line 100 connected to speaker 96 and a line 102 connected to microphone 98.

Circuit components included in the circuit of FIG. 3 include a mixer 104, a noise generator 106, a signal generator 108 for generating a signal S1 and a signal generator 110 for generating a signal S2. There is, moreover, included an amplifier 112 and a noise indicator 114. A cut-off switch 116 is provided comprising switches 118, 120 and 122. The cut-off switch 116 is of known type which is normally closed, but which is opened in response to sound or a sound signal such as is provided by amplifier 112 via line 124.

Also included in the circuit of FIG. 3 is a signal receiver 126 for selectively receiving a signal S1 from another installation of the same type, there being, moreover, provided a signal receiver 128 for selectively receiving a signal S2 from another installation of like type.

Still further, there is included a normally closed amplifier and cut-off switch circuit 130 embodying a switch 132 and a normally open cut-off switch 134. Still a further switch circuit 136 is employed which is a delay switch, the details of which will be discussed hereinafter. An audio-level meter 138 may also be employed.

Microphone 70 is connected to amplifier 112 via line 140 and a portion of the signal on amplifier 112 is returned to speaker 68 via line 142 to provide for audio balance or the echo sense which makes for normal use of the telephone by giving the user a sense of hearing at the handset 66. This function and various means of achieving the same is known.

Power supply 90 is connected via line 144 to amplifier and cut-off circuit 130 and via line 146 to amplifier 112. The power supply is connected via line 148 to switch circuit 136.

Switch circuit 136 connects the power supply 90 to signal receiver 126 via line 150 and at the same time connects the power supply to signal generator 110 via line 152, switch 122 being connected in series therewith.

When switch circuit 136 is operated, the connections via lines 150 and 152 are limited and the power supply 90 is then connected via lines 154 and 156 to signal receiver 128 and signal generator 108 respectively.

Switch circuit 136 receives a signal via line 158 from signal receiver 126. The signal received via line 158 blocks the switch circuit 136 and prevents the latter from performing a switching operation so that connection of the power supply 90 is normally effective with signal receiver 156 and signal generator 110. The signal received via line 158 is transmitted from signal receiver 126 via line 160 and passes also to the normally off-switch 134 to close the same, whereby the power supply is connected via lines 162 and 164′ to the noise generator 106 via switch 118. Switch 134 can also be operated by a signal received from signal receiver 128 via line 162.

Output signals from signal receivers 126 and 128 are transmitted via lines 164 and 166 to the amplifier and cut-off circuit 130. This latter circuit also receives intelligence signals via line 170 from microphone 98 and transmits the same via line 172 to speaker 68. Signals S1 and S2 received from another installation of like construction pass from line 102 via lines 174 and 176 to signal receiver 126 and 128 respectively.

Noise indicator 114 is connected to the input of generator 106 via line 178. Noise generator 106, signal generator 108 and signal generator 110 respectively feed their output signals to mixer 104 via lines 180, 182 and 184 respectively. Amplifier 112 feeds an input signal to mixer 104 via line 186.

The aforenoted signals S1 and S2 are the signals transmitted via a cable to another installation of like type to control the switching of the apparatus at the other end. Signals S1 and S2 will be standard for all installations and are signals of two respective frequencies F1 and F2 which lie outside of the normal speech spectrum. Signal receivers 126 and 128 are respectively tuned to the frequencies of signals S1 and S2.

The amplifier and cut-off circuit normally amplifies audio signals received from microphone 98. However, circuit 130 is opened by signals received from signal receivers 126 and 128.

Switching circuit 136 normally connects the power supply to generator 110 and receiver 126 for a fixed and pre-selected time period such as, for example, 30 seconds after switch 74 is actuated. As noted hereinabove, switch circuit 136 is controlled by receiver 126 to maintain the power supply to generator 110 and receiver 126. However, if no signal is received before the lapse of the critical time, switch circuit 136 transfers the power supply to generator 108 and receiver 128.

Switch 134 is a cut-off circuit controlled by signals received from receivers 126 and 128. The switch circuit is normally opened, but when a signal is received from receiver 126 or 128, circuit 134 closes permanently until intentionally reset.

When the handset 74 is lifted from the cradle 52 of installation 50 (FIG. 2), switch 74 activates power supply 90. Power is supplied to amplifier 112 and amplifier and cut-off circuit 130. Power is also supplied to generator 110 via switch 122 and to receiver 126 through switch circuit 136.

Generator 110 thus transmits signal S2 via mixer 104, line 100, speaker 96 and microphone 58 to the transmission cable.

At this point there are two possibilities. If the phone being described is calling another phone, it is obvious that no signal S1 would be received. Switch circuit 136, after the lapse of the critical time, then switches power from generator 110 and receiver 126 to generator 108 and receiver 128. Generator 108 now sends the signal S1 into the transmission cable via mixer 104, line 100, speaker 96 and microphone 58. If in this time receiver 128 receives a signal S2 via lines 102 and 176 from microphone 98 and speaker 56 (the other phone involved being equipped with similar apparatus), receiver 128 is activated and sends a signal via line 162 to cut-off circuit 134. This circuit closes permanently and power is applied to noise generator 106 via lines 162, 164 and switch 118. The power is also applied to noise indicator 114 via line 178.

The system is now operative to transmit noise, this having been completed by the receipt of a signal S2 by receiver 128. It is to be noted, however, that upon opening of switch 118, power supply to noise generator 106 is terminated and it will be further noted that this can be completed by operation of amplifier 112 under the effective signals received from microphone 70.

If, however, receiver 128 did not receive the signal S2 as aforesaid (in the event the other phone is not equipped with the same apparatus), the system remains inoperative and a normal communication without provision of noise signals takes place between the two phones. The reason for this is that no signal is fed from receiver 128 via line 162 to cut-off circuit 134 so that no power is supplied via line 164' to noise generator 106. This indicates that the noise generator 106 can only be rendered operative by the receipt of appropriate signals in receivers 126 or 128 and this can only take place when the phone installation has been coupled with another phone installation provided with the same apparatus.

If the phone installation illustrated in FIG. 3 is being called by another phone, and if signal S1 is received before the critical time after the handset 66 is lifted up, or in other words displaced, receiver 126 is actuated and sends a signal to switch circuit 136. This circuit is blocked from switching and power is maintained on generator 110 and receiver 126. The receiver 126 transmits a signal via line 160 to cut-off circuit 134 and power is applied to noise generator 106, as well as to noise indicator 114. The system is operative.

If, however, signal S1 is not received before the critical time after the displacement of handset 66, as will take place if the calling phone were not to be equipped with the same apparatus, switch circuit 136 switches the power to generator 108 and receiver 128. Generator 108 then transmits signal S1 via mixer 104 and line 100 as well as speaker 96 and microphone 58 into the interconnecting cable. Receiver 126 will obviously not receive signal S1 since the other phone is not provided with the necessary apparatus. The system remains inoperative, and a normal communication takes place between the two phones.

When the system is, however, operative, the same sequence of operations takes place whether the phone has initiated the call or has been called by another phone. The only difference is that the generator 108 and receiver 128 are supplied with power in the first case, whereas generator 110 and receiver 126 are supplied with power in the second case.

In order to better understand the operation of the system, it will be assumed that communication is between the phone stations 10 and 12 of FIG. 1 and it will be assumed that phone station 10 has called phone station 12. Only the functional operation of phone station 12 will be explained as the operation of phone station 10 is similar.

When microphone 70 is actuated, speech signals pass via line 140 to amplifier 112 and are amplified. The amplified signals are sent via line 186 to mixer 104 and then are passed to the connecting cable 14 through speaker 96 and microphone 58. Signals from amplifier 112 actuate cut-off circuit 116 so that power is cut off from generator 110, noise generator 106 and noise indicator 114. As a result, only speech signals or intelligence signals are transmitted.

If at the same time the phone station 10 was also transmitting speech signals, which would be a rare overlapping case, no S1 signal or noise signal would be received from phone station 10. Thus all speech signals received at speaker 56 would pass through microphone 98, line 102, line 170 and amplifier and cut-off circuit 130 and through line 172 to speaker 68.

However, if phone station 10 was not transmitting speech or intelligence signals, it would then have to be transmitting an S1 signal and noise signals. These signals would be received via speaker 56 and microphone 98 and would pass to amplifier cut-off circuit 130 and receiver 126, receiver 126 being activated would send a signal to amplifier and cut-off switch 130 and would open the latter circuit. As a result, these noise signals would not pass through amplifier 126 and would not reach speaker 68. It will be noted that speech signals transmitted via microphone 70 would also not reach speaker 68. Therefore a fraction of the signal from amplifier 112 is transmitted via line 142 to speaker 60 to provide the voice echo normally present in commercially available communication systems.

When microphone 70 is not activated signal S2 and noise signals are sent to mixer 104 and are transmitted to the interconnecting cable via microphone 58. If at the same time phone installation 10 was transmitting speech signals, no S1 signal or noise signal would be received from phone installation 10. Thus the speech signals transmitted by phone installation 10 will be received by amplifier and cut-off circuit 130 and pass through to speaker 68. The noise signals transmitted at this time over the interconnecting cable by phone installation 12 are not received at speaker 56 due to the perfect balance of hybrid circuit 94 as is well known.

If phone installation 10 is not transmitting speech signals, it would then be transmitting the S1 signal and noise signals. These go to circuit 130 and receiver 126 which latter circuit is actuated and sends a signal to amplifier and cut-off circuit 130 to open the latter. As a result, noise signals do not pass through amplifier and cut-off circuit 130 and do not reach speaker 68.

From the above it will be seen that phone installation 10 masks the speech or intelligence signals transmitted by phone station 12 and vice versa.

Figure 4:
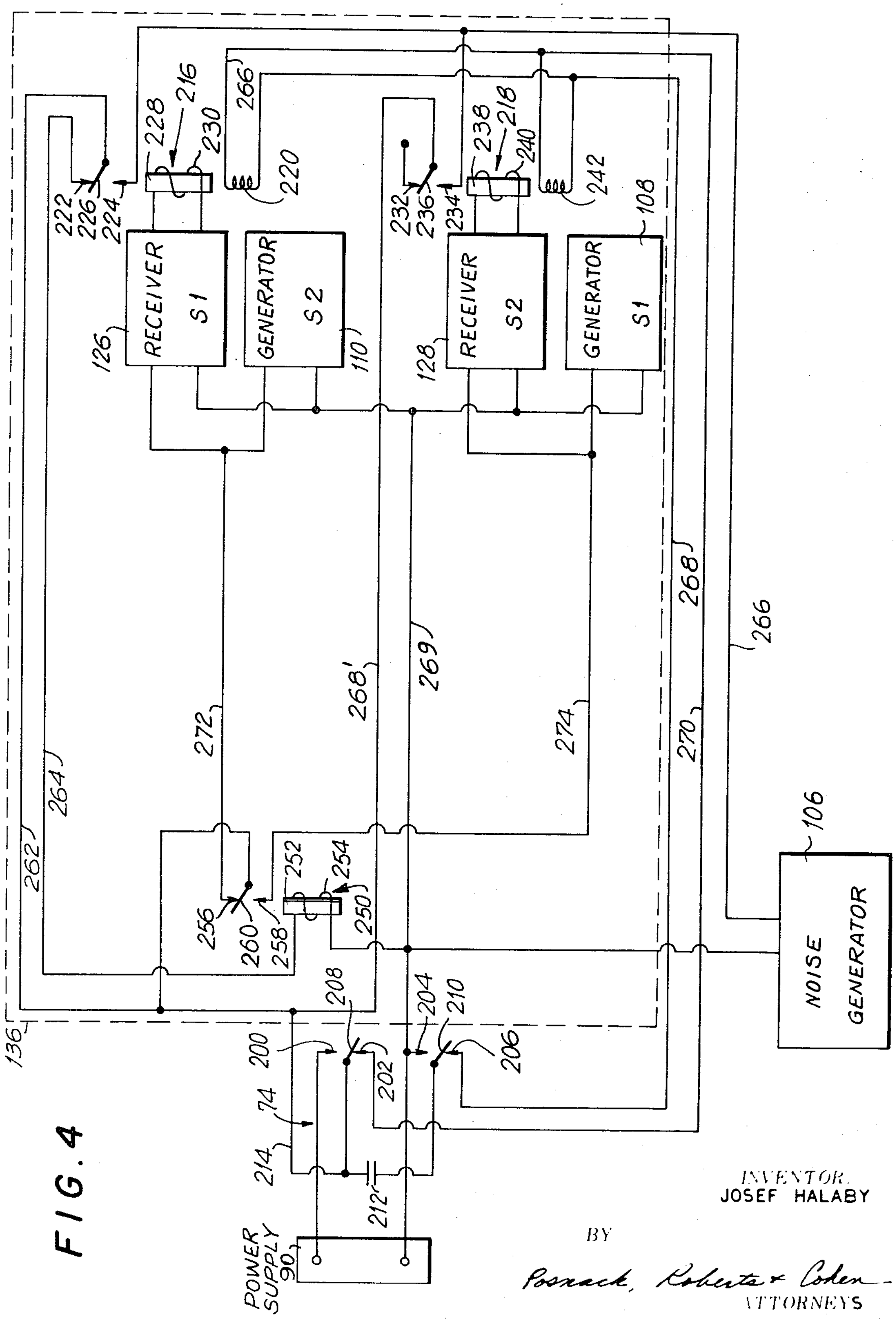
FIG. 4 is a partially broken and partially schematic diagram of a portion of the circuit of FIG. 3.

The power supply 90 of FIG. 3 also appears in FIG. 4, as does receivers 126 and 128 and generators 108 and 110. Noise generator 106 is also seen in FIG. 4.

Switch 74 is indicated in FIG. 4 in schematic form. It includes contacts 200, 202, 204 and 206 with switch blades 208 and 210. A capacitor 212 is connected between blades 208 and 210 and line 214 connects blade 208 of switch 74 to switch blade of relays 250, 216, 218.

Switch circuit 136 includes latch relays 216 and 218. Relay 216 includes a reset coil 220, contacts 222 and 224 and blade 226. The armature 228 of relay 216 has a coil 230 connected to receiver 126.

Relay 218 includes contacts 232 and 234 and blade 236 and the armature 238 of relay 218 includes a coil 240 connected across receiver 128. Relay 218 furthermore includes a reset coil 242. Relays 216 and 218 are latching relays which close permanently after being activated. The relays are reset by the operation of coils 220 and 242.

Circuit 136 furthermore includes a time delay relay including an armature 252 with a coil 254. Relay 250 includes contacts 256 and 258 and a switch blade 260.

The operation of relay 250 is deferred for the above noted critical time, such as 30 seconds after power is applied to coil 254.

When the aforenoted handset 66 is lifted or displaced, switch 74 is operated and switch blades 208 and 210 pass from contacts 206 and 202 to contacts 204 and 200. Power is then applied from power supply 90 to capacitor 212, which is thereby charged and is also applied to coil 254 of relay 250 through lines 262 and 264 and the switch blade 266 of relay 216.

Power is also supplied to the receiver 126 and generator 110 through line 272 and the switch blade 260 of relay 250.

If at this point signal S1 is received before the critical time has elapsed, relay 216 is actuated. Blade 226 switches from contact 222 to contact 224. Power is removed from relay 250 and is applied to noise generator 106 via line 266.

If no signal is received before the critical time has elapsed, relay 250 is actuated and blade 260 switches to contact 258. Power is removed from receiver 126 and generator 110 and is applied to receiver 218 and generator 108. If now a signal S2 is received, relay 218 is energized and power is applied to noise generator 106 via line 266.

After a communication and when the handset is returned to its cradle, switch 74 returns blades 208 and 210 to contacts 202 and 206. Power is thus removed from the associated circuit. At this time, capacitor 212 discharges through coils 220 and 242 via lines 268 and 270 and resets relays 216 and 218.

The noise generator 106 referred to hereinabove may take the form of a gaseous tube generator of continuous spectrum energy, the band employed moving all frequencies up to a limiting frequency corresponding to the uppermost frequencies employed in speech transmission. Such generators are well known and require no further clarification in this text.

The noise signals may also advantageously take the form of a tone channel whose frequency may vary, for example, by the use of a variable capacitor to the range indicated above.

The capacitor may be coupled to the armature of the audio level meter 158 of FIG. 3 to move with the same so that the frequencies of the noise signals vary constantly.

Figure 5:
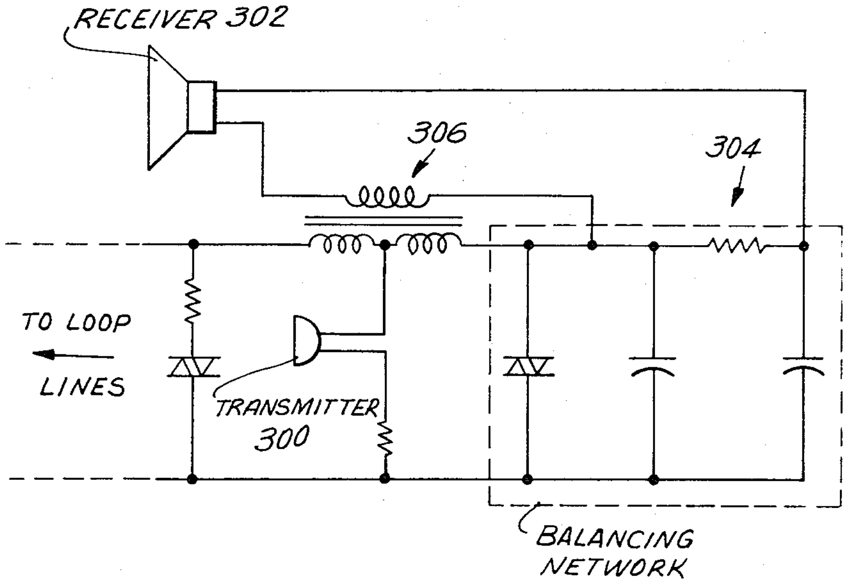
FIG. 5 is a schematic diagram of the transmission circuit of a telephone set illustrating the principle thereof.

FIG. 5 illustrates the transmission circuit of a telephone set such as the conventional Bell System 500 type. The set is composed of a transmitter 300, a receiver 302 and an electrical network 304 for equalization and associated circuitry to control sidetone and to connect power and signalling. The transmission circuit of the telephone set separates the transmitter and receiver circuits to limit the amount of the talker's signal appearing in his own receiver (sidetone) and to block the direct current in the transmitter from the receiver. Conventionally, the sidetone is provided for the convenience of the talker as the absence of the sidetone would make telephone communication seem unnatural and tend to cause people to talk loudly. The three-winding transformer 306 and the sidetone balancing network form a hybrid circuit which places the transmitter in conjugate relationship with the receiver. For use with the scrambling device of the invention, the sidetone is eliminated. The hybrid network is adjusted to permit the signals from the transmitter to be transmitted over the lines, but to prevent transmission of the signals from the transmitter to the receiver. The hybrid circuit also permits transmission of signals coming over the lines to the receiver. The hybrid network and adjustment procedure are all conventional and do not in themselves constitute a part of this invention.

Figure 6:
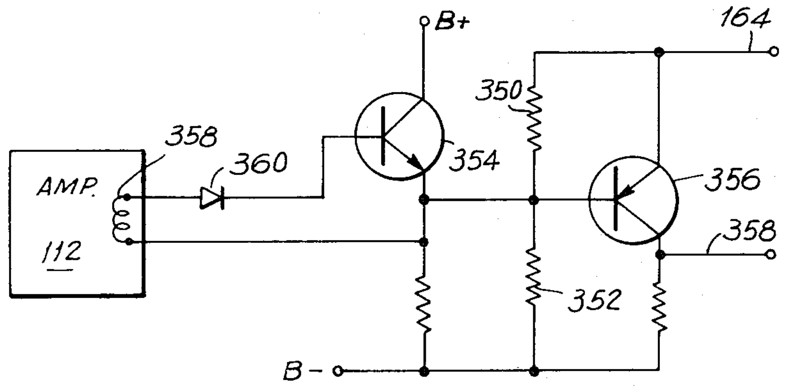
FIG. 6 is a schematic diagram illustrating the details of part of the circuit of FIG. 3.

Finally, reference is made to the details of the cut-off circuit 116 illustrated in FIG. 6 in association with the amplifier 112. This cut-off circuit advantageously takes the form of a transistor switching circuit in which a voltage divider consisting of resistors 350 and 352 is connected between transistors 354 and 356. Any signal picked out of amplifier 112 by coil 358 passes via diode 360 to transistor 354 which turns off transistor 356 by applying a positive potential to its base. Line 164 indicated in FIG. 6 is the equivalent of the same line indicated in FIG. 3, whereas line 358 is the line appearing in FIG. 3 connecting switch 118 to noise generator 106. The same circuits are repeated for lines 152 and 156.

What is claimed is:

1. In telephone apparatus comprising a line, a speaker, a microphone, and a hybrid circuit connecting the speaker and microphone to each other and to said line for the transmission and receipt of signals and for the balancing of signals between said speaker and microphone, an improvement for interfering with the unauthorized interception of intelligence signals passing between said apparatus and another like apparatus, said improvement comprising a second speaker, a second microphone, and coupling means coupling the second microphone with the first microphone and the second speaker with the first speaker, said means selectively coupling intelligence signals from the second microphone to said first microphone for transmission via said line to said other apparatus and transmitting a control signal of predetermined frequency to said first microphone for transmission via said line to said other apparatus, said means including a noise generator responsive to a signal of said predetermined frequency received from said other apparatus to transmit a noise signal via the first microphone onto said line to conceal intelligence signals received from said other apparatus, intelligence signals and the control signal being selectively transmitted between said apparatuses for the selective transmission of intelligence and generation of noise.

2. Apparatus as claimed in claim 1, wherein said means includes first and second generator means for generating first and second control signals one of which is the first control signal transmitted by said coupling means and first and second receiver means respectively adapted for receiving one of the control signals from said other apparatus, said generator means being coupled to the first said microphone, said receiver means being connected to the first said speaker, and cut-off means responsive to said receiver means to actuate said noise generator.

3. Apparatus as claimed in claim 2 comprising a mixer coupling said generator means and noise generator to the first said microphone, an amplifier coupling said second microphone to said mixer, a power supply, and first switch means coupling said power supply to said noise generator and generator means.

4. Apparatus as claimed in claim 3 comprising second switch means connecting said power supply selectively to one of the generator means and receiver means or to the other of the generator means and receiver means.

5. Apparatus as claimed in claim 4 comprising a handset supporting said second microphone and speaker, a switch actuating said power supply and operated upon displacement of said handset, said second switch means including means to switch the power supply from one generator means and receiver means to the other after the lapse of a predetermined time following displacement of said handset.

6. Apparatus as claimed in claim 5, wherein said first switch means is responsive to said amplifier to decouple the power supply from the noise generator and generator means.

7. Apparatus as claimed in claim 6, wherein said second switch means is coupled to one of the receiver means to receive a blocking signal from the latter to prevent switching.

8. Apparatus as claimed in claim 7 comprising speaker means coupling said mixer to said first microphone, microphone means coupled to said first speaker, and normally closed switch means coupling said microphone means to said second speaker.

9. Apparatus as claimed in claim 8 comprising a telephone cradle means, a second handset electrically coupled to said telephone cradle means and supporting said first microphone and speaker, a casing having openings to accommodate the second handset and supporting the speaker means and microphone means adjacent the same, the first said means being supported in the casing and electrically coupled to the first said handset which is accommodated on said cradle means.

10. Apparatus as claimed in claim 7, wherein said second switch means comprises a power source coupled to the switch operated by the first said handset, first and second latch relays operated by respective of said receiver means, and including switch means for coupling said power source to said noise generator, and a time delay relay including an armature coupled between said noise generator and the switch means of one of the latch relays and a switch means coupling said power source selectively to one of the receiver and generator means or to the other of the receiver and generator means.

11. A telephone system comprising first and second telephone stations mutually coupled for the transmission of intelligence therebetween and each including speaker-microphone means, noise generator means coupled to the speaker-microphone means and control means coupled to the noise generator means and speaker-microphone means, the speaker-microphone means of one station being adapted to transmit control signals of a predetermined frequency from the associated control means to the control means of the other station which is thereby actuated to control the noise means of said other station to transmit noise signals through the speaker-microphone means of said other station to conceal intelligence being received by the latter from said one station.

12. A telephone system comprising first and second telephone stations mutually coupled for the transmission of intelligence therebetween and each including speaker-microphone means, noise generator means coupled to the speaker-microphone means, control means coupled to the noise generator means and speaker-microphone means and including cut-off means coupled to the control means and speaker-microphone means, the speaker-microphone means of one station being adapted to transmit a control signal from the associated control means to the control means of the other station which is thereby actuated to control the cut-off means of said other station to disengage the associated speaker means and therefore prevent the noise signals being transmitted from said one station from reaching the speaker means of said other station.

* * * * *